UNITED STATES PATENT OFFICE.

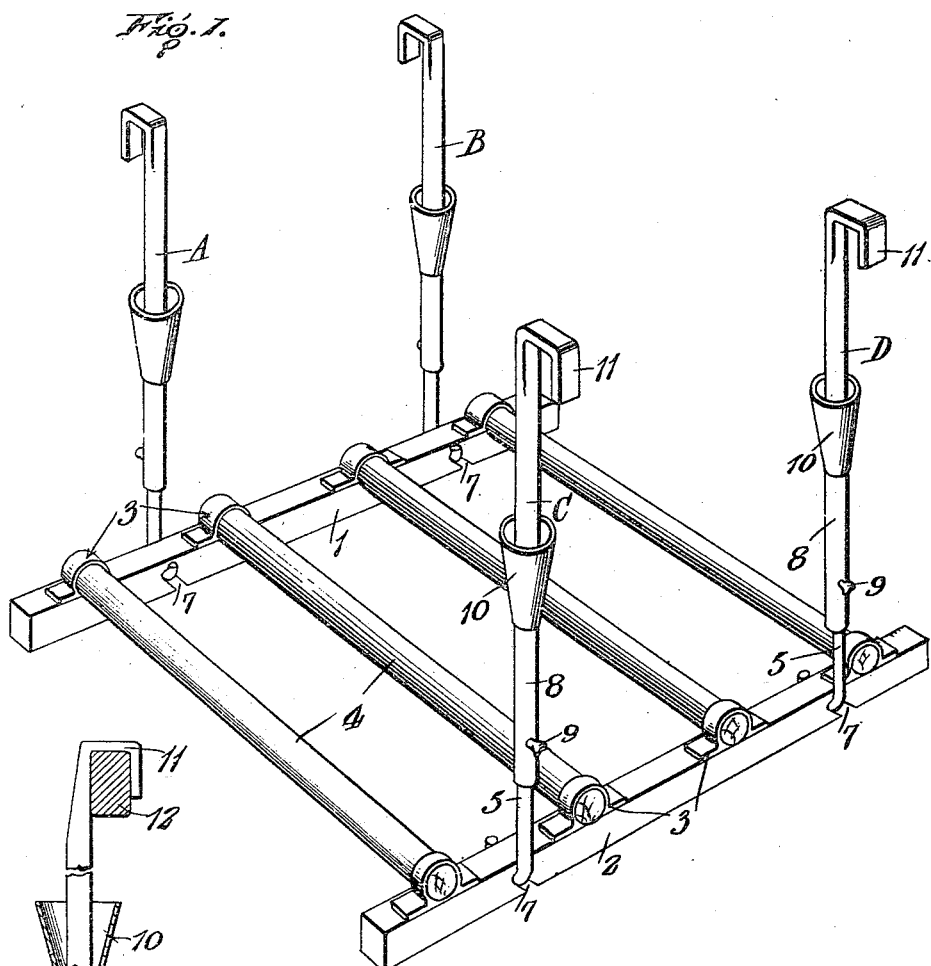
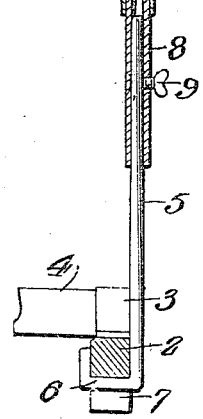

FREDERICK LILLIE, OF ARBUCKLE, CALIFORNIA.

POULTRY-ROOST.

1,245,159.   Specification of Letters Patent.   Patented Nov. 6, 1917.

Application filed August 29, 1916. Serial No. 117,498.

*To all whom it may concern:*

Be it known that I, FREDERICK LILLIE, a citizen of the United States, and resident of Arbuckle, in the county of Colusa and State of California, have invented certain new and useful Improvements in Poultry-Roosts, of which the following is a specification.

The present invention relates to animal husbandry and has particular reference to new and useful improvements in chicken roosts and the like.

The primary object of my invention is to provide a fowl roost adapted for disposition in a coop or the like having means associated therewith permitting the roost being suspended at an angle.

A further object of my invention is to provide a device of the class described which is simple in construction, strong and durable and may be applied to any of the existing types of poultry coops.

Other objects and advantages to be derived from the use of my improved poultry roost will appear from the following detail description and the claims, taken with an inspection of the accompanying drawing, in which:

Figure 1 is a perspective view of a poultry roost embodying the improvements of my invention; and Fig. 2 is a fragmental sectional view of one of the suspending elements therefor.

Referring more particularly to the drawing, where similar characters of reference designate like and corresponding parts throughout the various views, 1 and 2 designate the side stringers of my improved roost, said stringers having a plurality of hollow bracket members 3 arranged in complemental positions thereon to receive the free ends of transversely extending bars 4 providing the supporting means for the fowls. The structure described in the foregoing forms the main supporting frame of my improved roost.

The suspending means therefor includes a plurality of members, in the present instance four in number designated A, B, C and D, respectively, in their entireties. All of the suspending members are identical in construction and I will, therefore, describe but one of the same.

Referring specifically to Fig. 2, wherein one of the suspending elements is shown, I provide a rod 5 having a laterally extending hook portion 6 on the lower end thereof for engagement with one or the other of the side stringers 1 and 2, said stringers being provided with inclined recesses 7, said recesses being inclined for a purpose which will hereinafter appear.

A tubular section 8 receives the rod 5, said rod and section being relatively adjustable, a wing nut 9 serving to maintain said rod and section in adjusted positions. A cup 10 is carried by the tubular section 8 and is adapted to receive a disinfectant liquid such as sheeps' dip or the like. The upper free end of the tubular member 8 is bent laterally to form a hook 11 for engagement with a stringer 12, which may be one of the rafters of the poultry house.

In installing my improved roost the same may be placed within a poultry house with one pair of the suspending members longer than the other pair, so that the roost is disposed at an angle within the coop. Hence the provision of the inclined recesses 7, for preventing accidental displacement of the frame. It will be seen that it is impossible for vermin to reach the fowls in view of the provision of the cups 10, it being impossible for vermin to pass said cups and reach the roost. It will also be readily seen that the suspending elements are readily adjustable to various types of coops. No nails, screws or other unreliable fastening elements are necessary for installing my improved roost, this is a point upon which I desire to lay particular stress as well as upon the simplicity of the structural arrangement.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

1. A poultry roost including a main frame, said frame being provided with inclined recesses providing means for securely suspending the main frame at an angle, suspending elements including rod portions having hooks for engagement in said recesses, tubular sections having one end adjustably mounted on said rods, and the upper free ends of the tubular members being provided with hook members for engagement with the rafters of a poultry house or the like.

2. In a device of the class described including a frame, comprising a pair of stringers arranged in spaced parallel relation, a plurality of bracket members mounted on said stringers, transversely extending rods having the ends thereof mounted in said brackets, said stringers having inclined recesses therein providing means for suspending the frame in an inclined position, a plurality of rod members having laterally extending portions formed on one end adapted to engage said recesses, tubular sections having one end adjustably mounted on said rods, and hook portions formed on the free ends of the tubular members for a purpose specified.

In testimony whereof, I affix my signature hereto.

FREDERICK LILLIE.